US008527560B2

(12) United States Patent
Lucco et al.

(10) Patent No.: US 8,527,560 B2
(45) Date of Patent: Sep. 3, 2013

(54) CONSERVATIVE GARBAGE COLLECTING WITH CONCURRENT MARKING AND CONCURRENT SWEEPING FOR MEMORY MANAGEMENT

(75) Inventors: Steven Lucco, Bellevue, WA (US); Curtis Cheng-Cheng Man, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 149 days.

(21) Appl. No.: 13/074,226

(22) Filed: Mar. 29, 2011

(65) Prior Publication Data
US 2012/0254265 A1 Oct. 4, 2012

(51) Int. Cl.
*G06F 17/30* (2006.01)

(52) U.S. Cl.
USPC ............................ 707/816; 707/813; 707/817

(58) Field of Classification Search
USPC ........................................ 707/813, 816, 817
See application file for complete search history.

(56) References Cited

U.S. PATENT DOCUMENTS

| | | | |
|---|---|---|---|
| 5,088,036 A * | 2/1992 | Ellis et al. ............... | 1/1 |
| 6,289,360 B1 * | 9/2001 | Kolodner et al. ....................... | 1/1 |
| 6,502,110 B1 * | 12/2002 | Houldsworth .......................... | 1/1 |
| 6,622,226 B1 * | 9/2003 | Dussud .......................... | 711/159 |
| 7,051,056 B2 | 5/2006 | Rodriguez-Rivera | |
| 7,089,272 B1 * | 8/2006 | Garthwaite et al. ................... | 1/1 |
| 7,197,521 B2 * | 3/2007 | Subramoney et al. ................. | 1/1 |
| 7,340,494 B1 * | 3/2008 | Detlefs et al. .......................... | 1/1 |
| 7,499,961 B2 * | 3/2009 | Detlefs .................................. | 1/1 |
| 7,533,228 B1 * | 5/2009 | Garthwaite .................... | 711/159 |
| 7,584,232 B2 * | 9/2009 | Guo ....................................... | 1/1 |
| 7,636,745 B1 * | 12/2009 | Detlefs ................................. | 1/1 |
| 7,685,185 B2 * | 3/2010 | Ramasubramanian et al. .............................. | 707/638 |
| 2003/0069905 A1 * | 4/2003 | Dussud .......................... | 707/206 |
| 2005/0021576 A1 * | 1/2005 | Barabash et al. ............. | 707/206 |
| 2005/0114413 A1 * | 5/2005 | Subramoney et al. ........ | 707/206 |
| 2005/0198088 A1 | 9/2005 | Subramoney | |
| 2007/0174369 A1 * | 7/2007 | Detlefs ......................... | 707/206 |
| 2007/0294499 A1 * | 12/2007 | Garthwaite .................... | 711/170 |
| 2008/0263295 A1 * | 10/2008 | Printezis et al. .............. | 711/159 |
| 2009/0030958 A1 * | 1/2009 | Garst, Jr. ....................... | 707/206 |
| 2010/0077172 A1 | 3/2010 | Pizlo | |
| 2011/0041137 A1 * | 2/2011 | Carmody et al. ............. | 718/107 |

OTHER PUBLICATIONS

Flood, Christine, et al.; Parallel Garbage Collection for Shared Memory Multiprocessors; Apr. 2001.

(Continued)

*Primary Examiner* — Thanh-Ha Dang
(74) *Attorney, Agent, or Firm* — Rau Patents, LLC

(57) ABSTRACT

Aspects for conservative garbage collecting are disclosed. In one aspect, a heap of objects is generated during an execution of a script, and script objects in an unexecuted portion are traced to corresponding memory locations on the heap. The heap is then marked concurrently with executing the script such that a marked heap includes reachable and unreachable objects. Memory allocated to the unreachable objects is then freed concurrently with executing the script based on the marking. In another aspect, an object graph associated with a call stack is generated and traced such that script objects in an unexecuted portion of the stack are traced to corresponding memory locations on a heap. Heap objects are marked concurrently with executing the stack so that a marked heap includes reachable and unreachable objects. Memory allocated to the unreachable objects is then cleared concurrently with executing the stack based on the marked heap.

20 Claims, 10 Drawing Sheets

(56) References Cited

OTHER PUBLICATIONS

Endo, Toshio, et al.; A Scalable Mark-Sweep Garbage Collector on Large-Scale Shared-Memory Machines, Aug. 9, 2010.
Printezis, Tony, et al.; A Generational Mostly-concurrent Garbage Collector; Jun. 2000.
Using the BEA JRockit Memory Management System; Aug. 2010.
Memory Management (Garbage Collection); Aug. 9, 2010.
"International Search Report", Mailed Date: Sep. 25, 2012, Application No. PCT/US2012/027795, Filed Date: Mar. 6, 2012, pp. 8.

* cited by examiner

CONSERVATIVE GARBAGE COLLECTING WITH CONCURRENT MARKING AND CONCURRENT SWEEPING FOR MEMORY MANAGEMENT

TECHNICAL FIELD

The subject disclosure relates to a conservative garbage collecting algorithm with concurrent marking and concurrent sweeping.

BACKGROUND

By way of background concerning some conventional systems, it is noted that computing devices have traditionally stored information and associated applications. To these and related ends, it is further noted that implementing an efficient memory management scheme can help to achieve optimal computing performance. Developments in automatic memory management schemes have been performed well over manual memory management schemes. Garbage collector algorithms, for instance, are automatic memory management schemes, which attempt to reclaim memory occupied by objects that are no longer in use by a particular program.

Tracing garbage collectors are a common type of garbage collector. Tracing garbage collectors first determine which objects are reachable (or potentially reachable), and then discard all remaining objects. A reachable object can be defined as an object for which there exists some variable in the program environment that lead to it, either directly or through reference from other reachable objects. More precisely, objects are generally reachable in two ways. First, a distinguished set of objects, known as roots, are assumed to be reachable. Typically, these include all objects referenced from anywhere in the call stack (that is, all local variables and parameters in the functions currently being invoked), and any global variables. Second, anything referenced from a reachable object is itself deemed reachable. A complication with conventional garbage collectors, however, is that garbage collectors need to quickly and efficiently free memory allocated to objects that are no longer reachable.

The above-described deficiencies of today's memory management schemes are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with conservative garbage collecting for memory management. In one such aspect, a method for concurrently marking and sweeping objects within a conservative garbage collecting algorithm is provided. The method can include generating a heap of objects during an execution of a script, and tracing script objects included in an unexecuted portion of the script to a corresponding set of memory locations on the heap. The embodiment can further include marking at least a portion of the heap concurrently with the execution of the script such that a marked heap includes reachable objects and unreachable objects. For this particular embodiment, reachable objects are reachable by the unexecuted portion of the script, whereas unreachable objects are unreachable by the unexecuted portion of the script. The method can then further include freeing memory allocated to the unreachable objects concurrently with the execution of the script based on the marking.

In another aspect, a memory management device configured to concurrently mark and sweep objects is disclosed. Within such embodiment, the memory management device includes a processor configured to execute computer executable components stored in memory. The computer executable components include a heap component, a tracing component, a marking component, and a recycling component. The heap component is configured to generate a heap of objects during an execution of a script, whereas the tracing component is configured to trace script objects included in an unexecuted portion of the script to a corresponding set of memory locations on the heap. The marking component is then configured to mark at least a portion of the heap concurrently with the execution of the script. For this embodiment, a marked heap includes reachable objects reachable by the unexecuted portion of the script, as well as unreachable objects which are unreachable by the unexecuted portion of the script. The recycling component is then configured to free memory allocated to the unreachable objects concurrently with the execution of the script and according to the marked heap.

In yet another aspect, a computer-readable storage medium is disclosed for concurrently marking and sweeping objects within a conservative garbage collecting algorithm. Within such embodiment, the computer-readable storage medium includes computer-readable instructions for causing at least one processor to perform various acts. For instance, such acts include generating an object graph associated with a call stack, and tracing the object graph such that script objects included in an unexecuted portion of the call stack are traced to a corresponding set of memory locations on a heap. This embodiment further includes marking heap objects concurrently with an execution of the call stack. For this particular embodiment, a marked heap includes reachable objects reachable by the unexecuted portion of the call stack, as well as unreachable objects which are unreachable by the unexecuted portion of the call stack. Memory allocated to the unreachable objects is then cleared concurrently with the execution of the call stack based on the marked heap.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
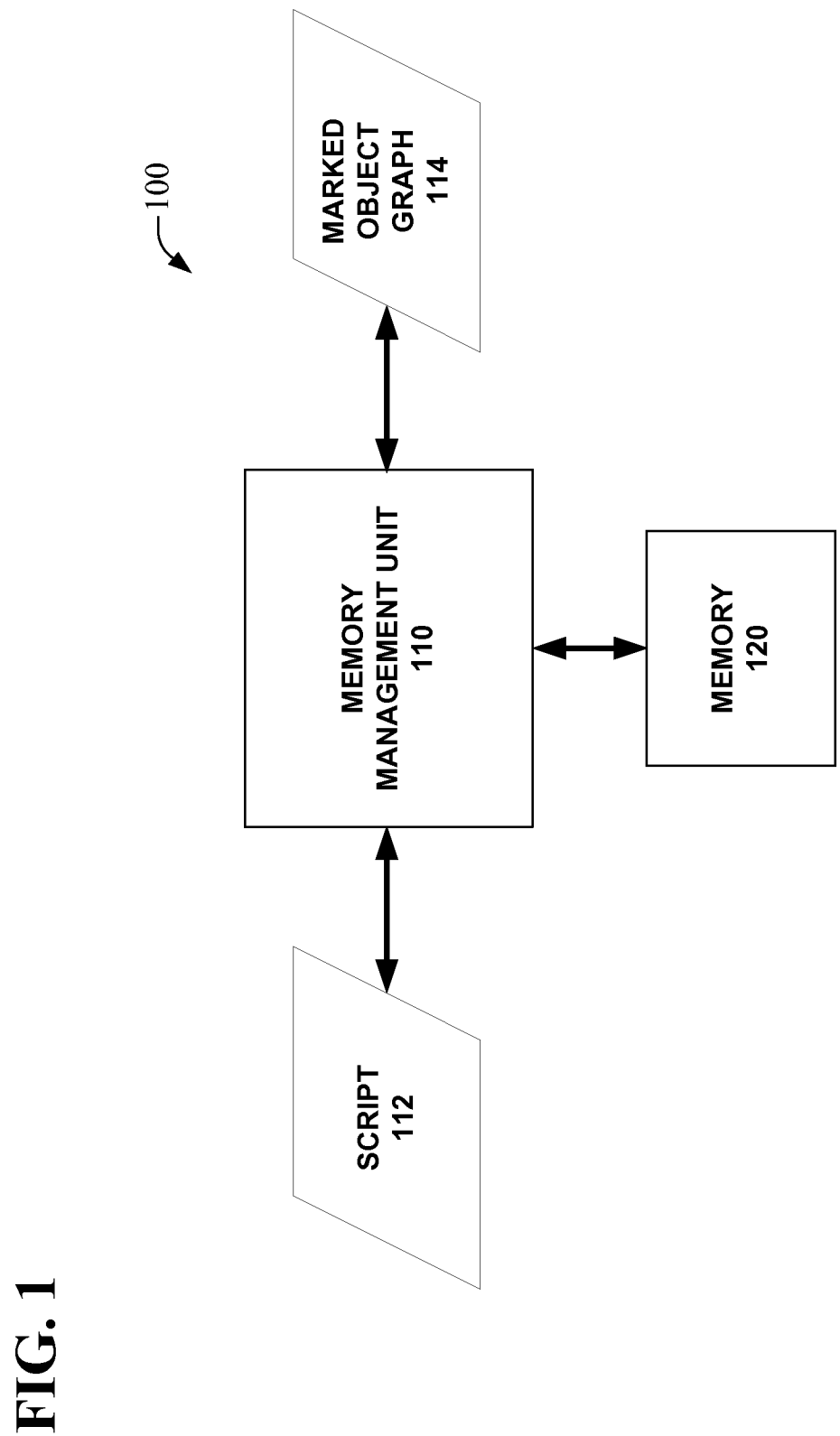
FIG. 1 illustrates an exemplary system that facilitates implementing a conservative garbage collecting algorithm according to an embodiment.

As indicated in the background, it would be desirable to implement a conservative garbage collector algorithm which distinguishes between reachable and unreachable objects on a heap. In various embodiments, memory management is redesigned around native code compatibility. In an aspect, script objects are less managed objects, and more just native pieces of memory such that reference counting among objects is eliminated. Moreover, a conservative garbage collection algorithm is implemented, where it is not assumed everything that is a pointer is known. With a common language runtime (CLR) garbage collector for instance, the stack is strongly typed. However, with native code, e.g., C code, and script code, one does not know what is on the stack. In this regard, instead of utilizing a reference counting model, it is contemplated that objects are interacted with directly.

The various embodiments disclosed herein are directed towards concurrently marking and sweeping objects within a conservative garbage collecting algorithm. Moreover, the aspects disclosed herein are directed towards concurrently marking and sweeping objects to facilitate an efficient execution of scripts (e.g., javascripts) against a document object model. In an exemplary embodiment, a concurrent marking includes a traversal of objects on a heap in which every object that is reachable is assigned a "1", whereas every object that is not reachable is assigned a "0". Once the concurrent marking has finished, a concurrent sweeper scans the heap and places unreachable objects (i.e., those marked with a "0") on a "free memory" list.

An advantage of implementing a concurrent sweeper is that less memory is used since memory is recycled back to the allocator as the script thread is executing. Here, it should be noted that some data structures are incident to achieving concurrent mark and sweep. For instance, some data structures maintain a free bit which is separate from a marked bit. Furthermore, separate heap block pages can be maintained so that an entire page can be recognized as free. The resources needed to reclaim such pages are thus minimized relative to previous techniques, wherein heap blocks are undesirably allocated for many pages and thus require more resources for reclaiming Moreover, by implementing the aspects disclosed a whole page can quickly be recognized as free with a simple check.

In another aspect, in contrast to how conventional sweepers require an entire sweep to take place before any of the swept memory could be re-used by the thread doing the work, a lock-free queue is created alongside the sweep process. Within such embodiment, the lock-free queue can be a data structure that enables handing pieces of memory back to the working thread (i.e., the thread executing the web page) during the sweep, which significantly reduces the amount of memory used as part of a working set. A much more incremental recycling mechanism is thus disclosed, wherein such recycling is desirably performed at a finer grain.

Concurrent marking and Sweeping for Conservative Garbage Collection

Several issues have arisen as the web browsing experience begins to evolve from a flat presentation of information with minimal interactivity to a richer application or applet experience with lots of interactivity at the client side. More generally, the web browsing experience has evolved into a hybrid of information display and richer interactivity with objects on display. Particular challenges with this evolution are based on adapting the old document object model (DOM), which was originally designed primarily for flat presentation of information based on native code on a client, to an experience that fluidly handles script code, such as javascript objects.

Improving speed helps so as to facilitate a smooth user experience. For instance, with fly out menus of the past, the web experience flickered with delays based on communications with the server. Scripts, however, enable small programs to modify the DOM on the fly without going back to the server. As people want to do more on the fly without returning to the server, making script code execute fast has become a challenge.

Since the user experience is largely influenced by effectively scripting the DOM, it is desirable to change the DOM as fast as possible to maximize the interactive response. Communication between the scripting engines and the native classes of the DOM were poor in the past due to the use of object linking & embedding (OLE) automation including a set of interfaces, e.g., iDispatch, iActiveScript, etc., which make any object scriptable. However, such methods are slow, and thus improvements are desired. Accordingly, the aspects disclosed herein are directed towards improving script execution speed by concurrently marking and sweeping objects within a conservative garbage collecting algorithm.

FIG. 1 illustrates an exemplary system that facilitates implementing a conservative garbage collecting algorithm according to an embodiment. As illustrated, system 100 can include memory management unit 110, which is communicatively coupled to memory 120. In an aspect, memory management unit 110 is configured to implement a conservative garbage collecting algorithm to manage memory space in memory 120. Moreover, memory management unit 110 is configured to generate a marked object graph 114 associated with an execution of script 112. For instance, script 112 may be a javascript executed against a DOM, wherein the javascript includes various objects requiring an allocation of memory space in memory 120. In a particular embodiment, to facilitate distinguishing between objects that are "reachable" and "unreachable", script objects included in marked object graph 114 are marked according to whether they are reachable by an unexecuted portion of script 112.

Figure 2:
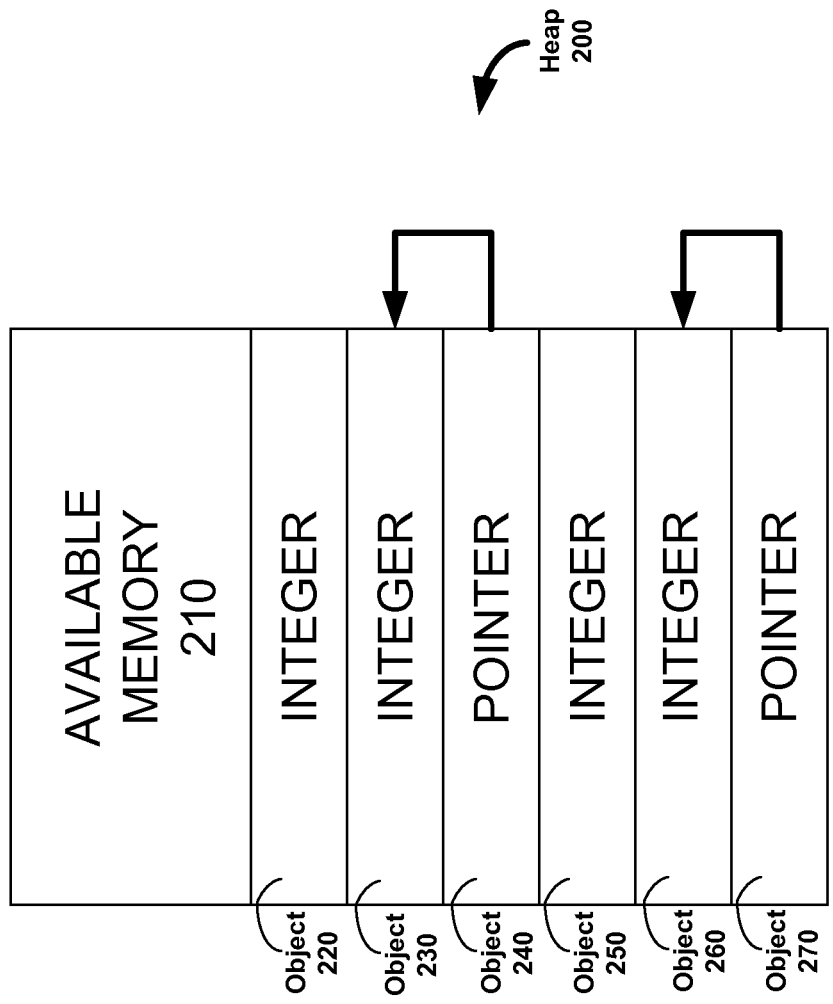
FIG. 2 is a diagram illustrating an exemplary heap of objects according to an embodiment.

In an aspect, memory allocated to script objects comprises storing such objects onto a heap. Referring next to FIG. 2, a block diagram of an exemplary heap of objects according to an embodiment is provided. As shown, heap 200 can include available memory 210, along with allocated memory corresponding to various objects 220, 230, 240, 250, 260, and 270. For this particular example, objects 240 and 270 correspond to pointer values, whereas objects 220, 230, 250, and 260 correspond to integer values. Namely, object 240 is a pointer value which references the integer value represented by object 230, whereas object 270 is a pointer value which references the integer value represented by object 260.

Figure 3:
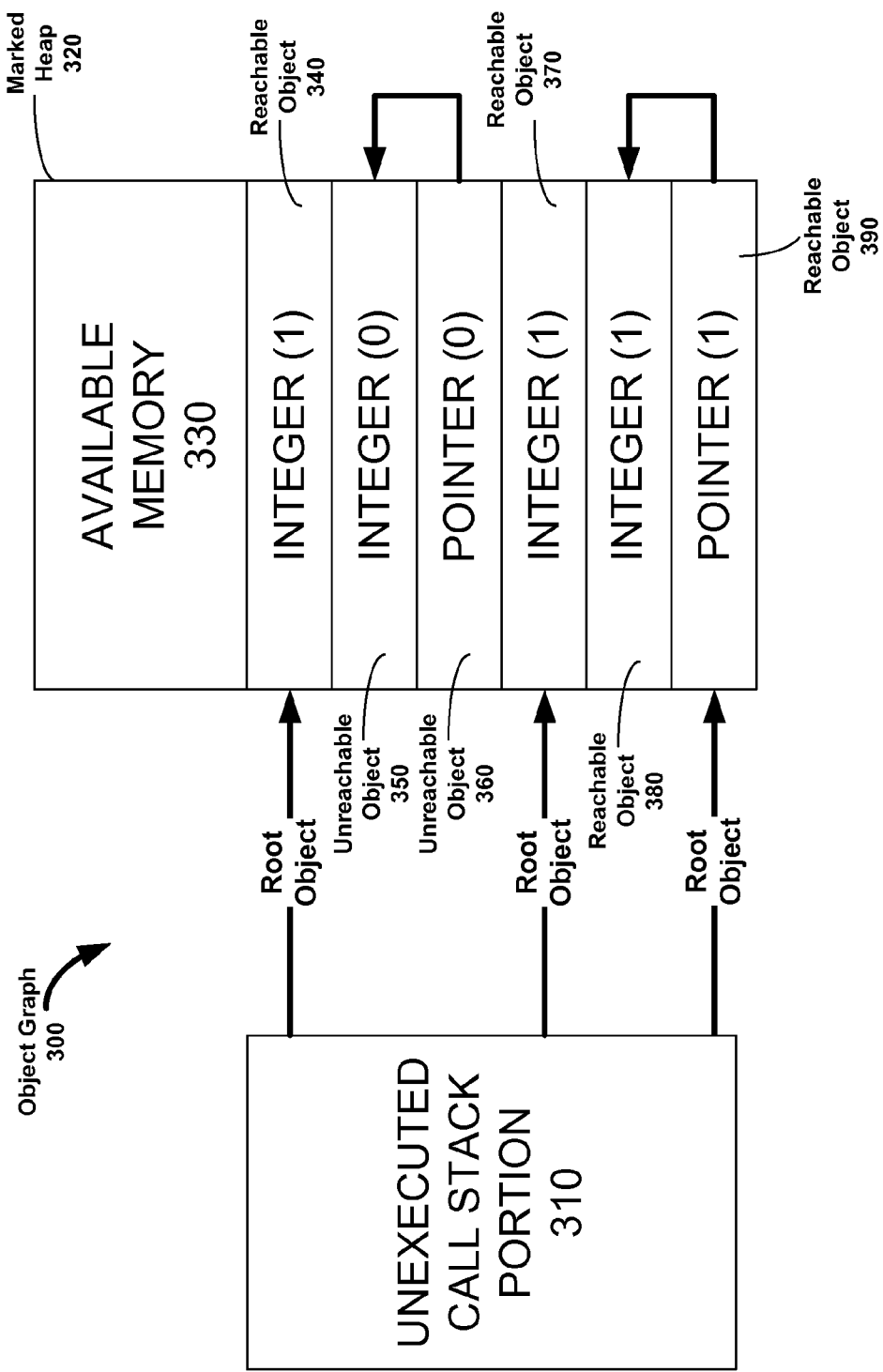
FIG. 3 is a diagram illustrating an exemplary object graph according to an embodiment.

It is contemplated that heap objects can be marked so that reachable objects are readily distinguishable from unreachable objects. Referring next to FIG. 3, a diagram illustrating an exemplary object graph is provided which facilitates a mapping of reachable/unreachable objects on the heap. As illustrated, object graph 300 maps objects included in an unexecuted call stack portion 310 to marked heap 320. To this end, it noted that marked heap 320 and available memory 330 are generally analogous to heap 200 and available memory 330, respectively.

In an aspect, object graph 300 is utilized to determine which objects on marked heap 320 are reachable by unexecuted call stack portion 310. Namely, root objects included in unexecuted call stack portion 310 are traced to corresponding memory locations on marked heap 320, wherein such memory locations are deemed reachable. It is then contemplated that a subsequent tracing of root objects is performed on reachable pointer values to identify reachable objects referenced by those pointer values. Here, it is noted that a subsequent tracing can be skipped on reachable integer values since such integer values do not reference other values. For this particular example, since reachable object 390 is a root object corresponding to a pointer value, a subsequent tracing is performed on reachable object 390, which identifies reachable object 380 corresponding to an integer value. A subsequent tracing, however, may be skipped on reachable objects 340 and 370 since these are root objects corresponding to integer values.

It should be noted that object graph 300 can also be utilized to identify objects unreachable by unexecuted call stack portion 310. In this particular example, unreachable objects 350 and 360 are deemed unreachable since they do not correspond to root objects in unexecuted call stack portion 310, nor are they referenced by a reachable pointer object.

Upon identifying reachable/unreachable objects, it is contemplated that at least one of the reachable or unreachable objects is marked so that they are readily distinguishable from each other. In an aspect, such marking occurs concurrently with the execution of the call stack. For this particular example, reachable object 340, reachable object 370, reachable object 380, and reachable object 390 are marked with a "1", whereas unreachable object 350 and unreachable object 360 are marked with a "0". Here, one of ordinary skill would appreciate that marking objects can be achieved in any of a plurality of ways including, for example, designating a bit to such marking within each object representation.

Figure 4:
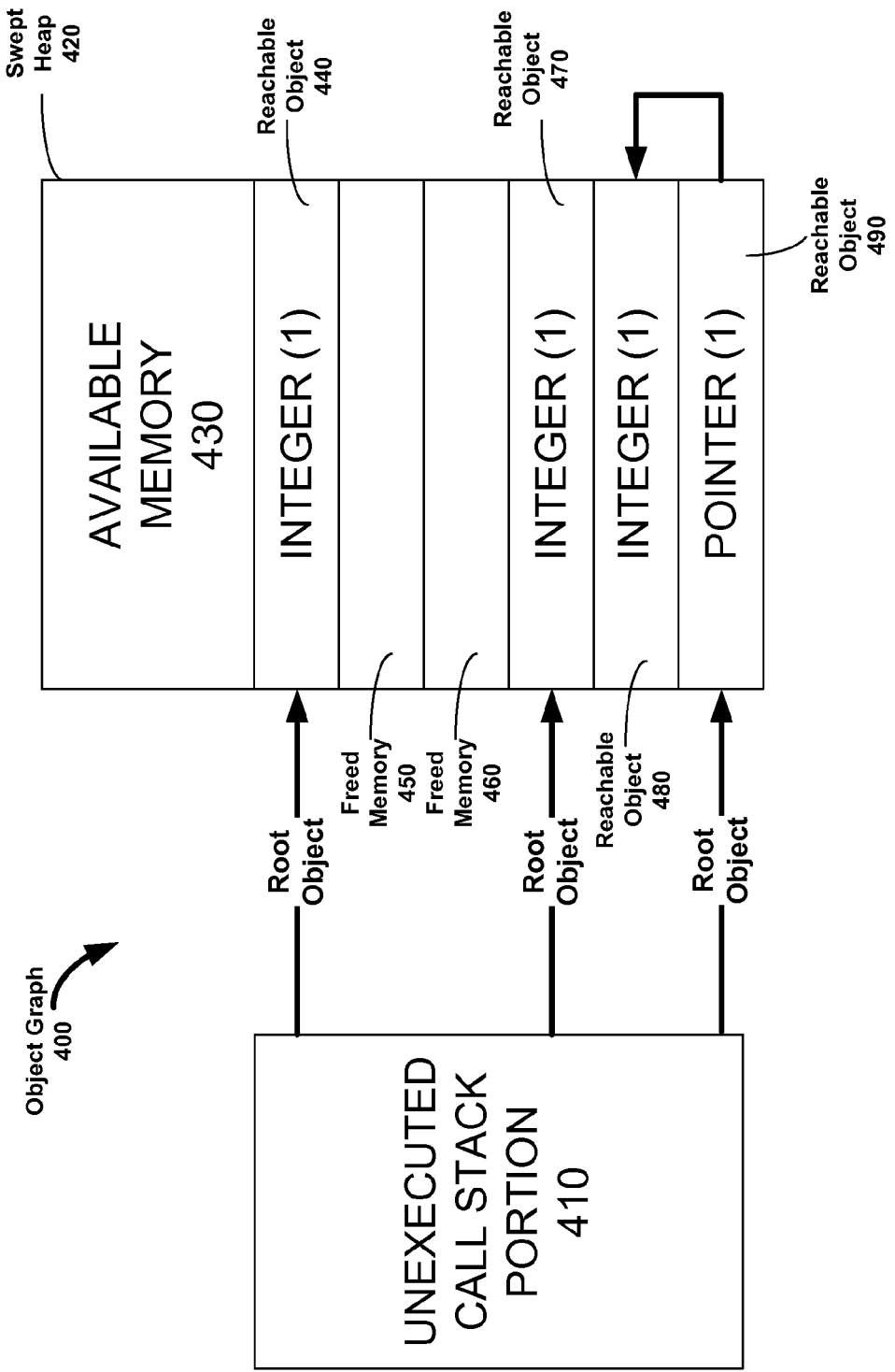
FIG. 4 is a diagram illustrating an exemplary freeing of memory according to an embodiment.

After an object graph has been appropriately marked, memory previously allocated to heap objects identified as unreachable can be cleared. In an aspect, the clearing of such memory occurs concurrently with the execution of the call stack. Referring next to FIG. 4 a diagram illustrating an exemplary freeing of memory according to an embodiment is provided. As illustrated, object graph 400 includes swept heap 420, which is generally analogous to heap 200 and 320, wherein heap 420 depicts a freeing of memory previously allocated to unreachable objects 350 and 360. Namely, heap 420 now includes freed memory 450 and 460, in addition to available memory 430. In an aspect, however, reachable objects 440, 470, 480, and 490 are preserved in their original storage locations (i.e., swept heap 420 is not collapsed).

Figure 5:
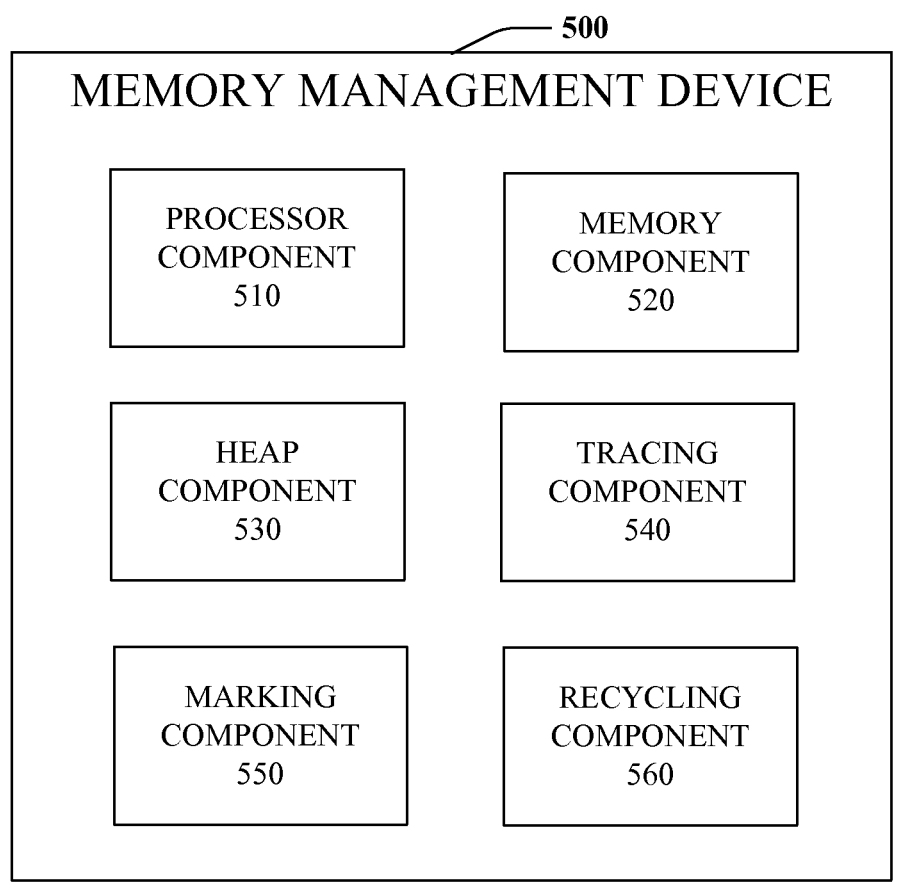
FIG. 5 is a block diagram illustrating an exemplary memory management device according to an embodiment.

Referring next to FIG. 5, a block diagram illustrates an exemplary memory management unit configured to implement a conservative garbage collecting algorithm in accordance with various aspects. As illustrated, memory management unit 500 can include processor component 510, memory component 520, heap component 530, tracing component 540, marking component 550, and recycling component 560.

In one aspect, processor component 510 is configured to execute computer-readable instructions related to performing any of a plurality of functions. Processor component 510 can be a single processor or a plurality of processors dedicated to analyzing information to be communicated from memory management unit 500 and/or generating information that can be utilized memory component 520, heap component 530, tracing component 540, marking component 550, and/or recycling component 560. Additionally or alternatively, processor component 510 can be configured to control one or more components of memory management unit 500.

In another aspect, memory component 520 is coupled to processor component 510 and configured to store computer-readable instructions executed by processor component 510. Memory component 520 can also be configured to store any of a plurality of other types of data including data generated by any of heap component 530, tracing component 540, marking component 550, and/or recycling component 560. Memory component 520 can be configured in a number of different configurations, including as random access memory, battery-backed memory, hard disk, magnetic tape, etc. Various features can also be implemented upon memory component 520, such as compression and automatic back up, e.g., use of a Redundant Array of Independent Drives configuration.

As illustrated, memory management unit 500 can also include heap component 530 and tracing component 540. Within such embodiment, heap component 530 is configured to generate a heap of objects during an execution of a script, whereas tracing component 540 is configured to trace script objects included in an unexecuted portion of the script to a corresponding set of memory locations on the heap.

In another aspect, memory management device 500 further includes marking component 550. Within such embodiment, marking component 550 is configured to mark at least a portion of the heap concurrently with the execution of the script. For this embodiment, a marked heap includes reachable objects reachable by the unexecuted portion of the script, as well as unreachable objects which are deemed unreachable by the unexecuted portion of the script.

In a further aspect, memory management device 500 also includes recycling component 560. Within such embodiment, recycling component 560 is configured to free memory allocated to the unreachable objects concurrently with the execution of the script and according to the marked heap. In a particular embodiment, recycling component 560 can be configured to recycle a portion of the memory allocated to the unreachable objects prior to a freeing of an entire portion of the memory allocated to the unreachable objects. In another embodiment, recycling component 560 can be configured to respectively preserve reachable objects in original storage locations of a heap. For example, recycling component 560 can be configured to maintain a separation of heap objects according to a fixed set of boundaries within the heap.

For some embodiments, memory management device 500 can be configured to execute the script from which heap component 530 generates a heap of objects. To this end, it should be appreciated that memory management device 500 can be configured to execute any of a plurality of script types. For instance, in a particular embodiment memory management device 500 is configured to compile a javascript. Upon executing the script, it is contemplated that memory management device 500 can then be further configured to modify a document object model based on the execution of the script.

Figure 6:
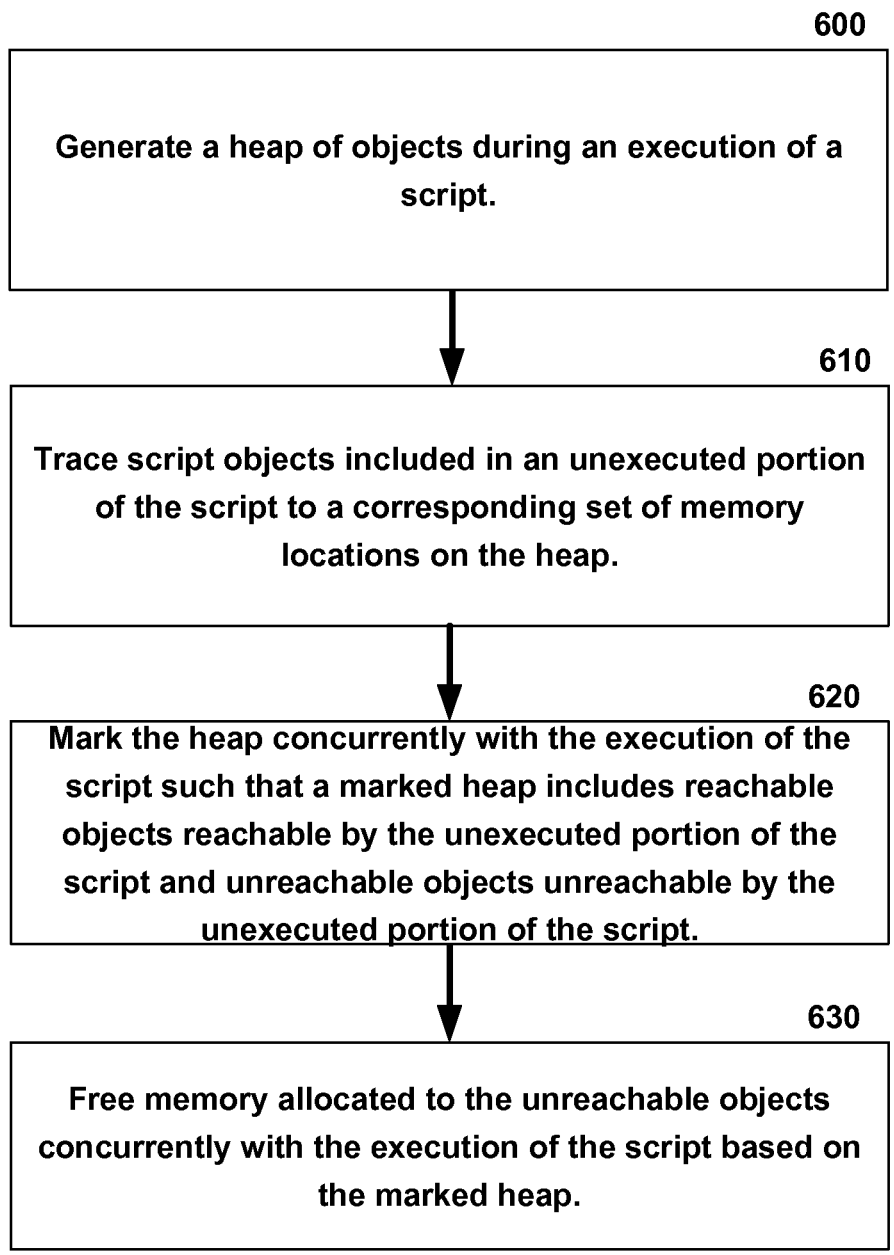
FIG. 6 is a flow diagram illustrating an exemplary non-limiting embodiment for implementing a conservative garbage collecting algorithm according to an embodiment.

FIG. 6 is a flow diagram illustrating an exemplary non-limiting embodiment for implementing a conservative garbage collecting algorithm according to an embodiment. At 600, a heap of objects is generated during an execution of a script. Next, at 610, script objects included in an unexecuted portion of the script are traced to a corresponding set of memory locations on the heap. The heap is then marked concurrently with the execution of the script at 620. For this particular embodiment, a marked heap includes reachable objects reachable by the unexecuted portion of the script, as well as unreachable objects unreachable by the unexecuted portion of the script. At, 630, memory allocated to the unreachable objects is then freed concurrently with the execution of the script based on the marked heap.

Figure 7:
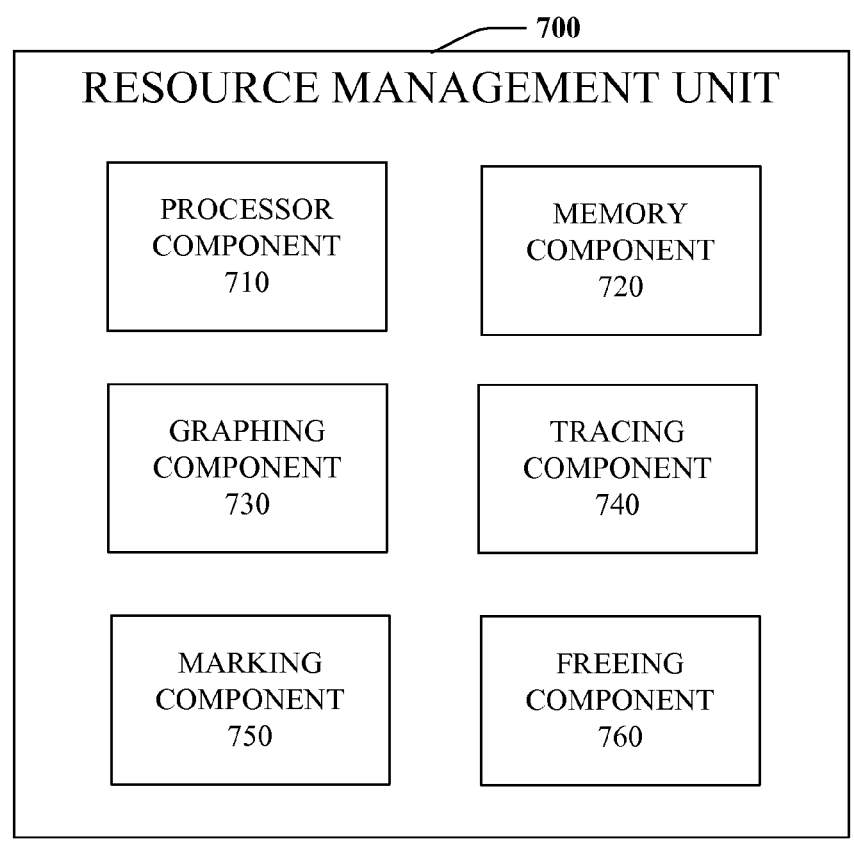
FIG. 7 is a block diagram illustrating an exemplary resource management unit according to an embodiment.

Referring next to FIG. 7, a block diagram illustrates an exemplary resource management unit configured to concurrently mark and sweep objects in accordance with various aspects. As illustrated, resource management unit 700 can include processor component 710, memory component 720, graphing component 730, tracing component 740, marking component 750, and freeing component 760.

Similar to processor component 510 in memory management unit 500, processor component 710 is configured to execute computer-readable instructions related to performing any of a plurality of functions. Processor component 710 can be a single processor or a plurality of processors dedicated to analyzing information to be communicated from resource management unit 700 and/or generating information that can be utilized by memory component 720, graphing component 730, tracing component 740, marking component 750, and/or freeing component 760. Additionally or alternatively, processor component 710 can be configured to control one or more components of resource management unit 700.

In another aspect, memory component 720 is coupled to processor component 710 and configured to store computer-readable instructions executed by processor component 710. Memory component 720 can also be configured to store any of a plurality of other types of data including data generated by any of graphing component 730, tracing component 740, marking component 750, and/or freeing component 760. Here, it is noted that memory component 720 is analogous to memory component 520 in memory management unit 500. Accordingly, it can be appreciated that any of the aforementioned features/configurations of memory component 520 are also applicable to memory component 720.

As illustrated, resource management unit 700 can also include graphing component 730 and tracing component 740. Within such embodiment, graphing component 730 is configured to generate an object graph associated with a call stack, whereas tracing component 740 is configured to trace the object graph such that script objects included in an unexecuted portion of the call stack are traced to a corresponding set of memory locations on a heap.

In another aspect, resource management unit 700 can further include marking component 750. Within such embodiment, marking component 750 is configured to mark heap objects concurrently with an execution of the call stack. For this embodiment, a marked heap includes reachable objects reachable by the unexecuted portion of the call stack, as well as unreachable objects which are deemed unreachable by the unexecuted portion of the call stack.

As illustrated, resource management unit 700 can also include freeing component 760. Within such embodiment, freeing component 760 is configured to clear memory allocated to the unreachable objects concurrently with the execution of the call stack. Here, it is contemplated that such memory can be cleared based on the marked heap ascertained by marking component 750. In an aspect, freeing component 760 can be further configured to respectively preserve a storage of objects reachable by the unexecuted portion of the call stack in their original memory locations within the heap. In another aspect, freeing component 760 can be configured to recycle a portion of the memory allocated to the unreachable objects. For this particular embodiment, freeing component 760 can be further configured to recycle such portion prior to a freeing of an entire portion of the memory allocated to the unreachable objects.

Figure 8:
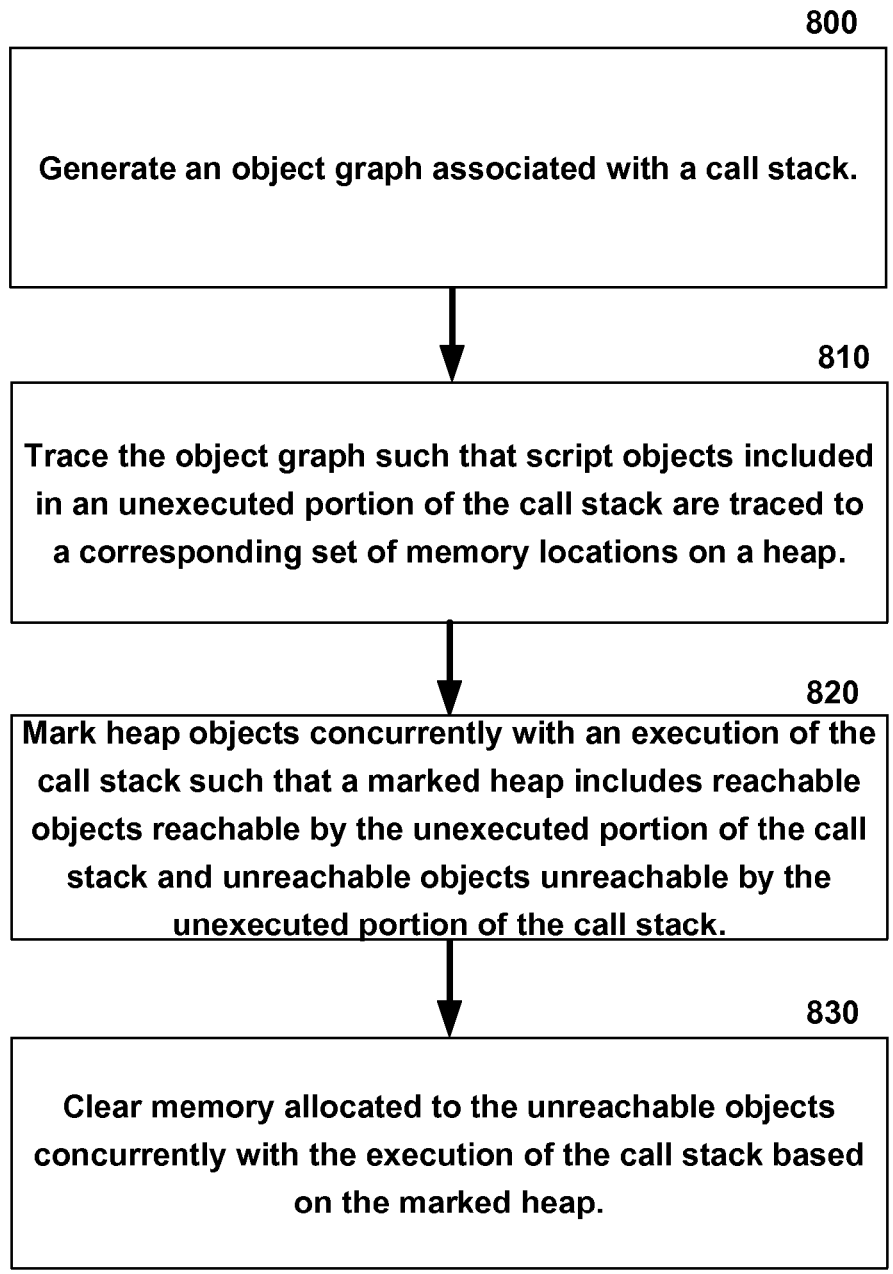
FIG. 8 is a flow diagram illustrating an exemplary non-limiting embodiment for concurrently marking and sweeping objects according to an embodiment.

FIG. 8 is a flow diagram illustrating an exemplary non-limiting embodiment for concurrently marking and sweeping objects according to an embodiment. At 800, an object graph associated with a call stack is generated. At 810, the object graph is then traced such that script objects included in an unexecuted portion of the call stack are traced to a corresponding set of memory locations on a heap. Next, at 820, heap objects are marked concurrently with an execution of the call stack. For this particular embodiment, a marked heap includes reachable objects reachable by the unexecuted portion of the call stack, as well as unreachable objects unreachable by the unexecuted portion of the call stack. At 830, memory allocated to the unreachable objects is then cleared concurrently with the execution of the call stack based on the marked heap.

Exemplary Networked and Distributed Environments

One of ordinary skill in the art can appreciate that the various embodiments for concurrently marking and sweeping objects within a conservative garbage collecting algorithm described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 9:
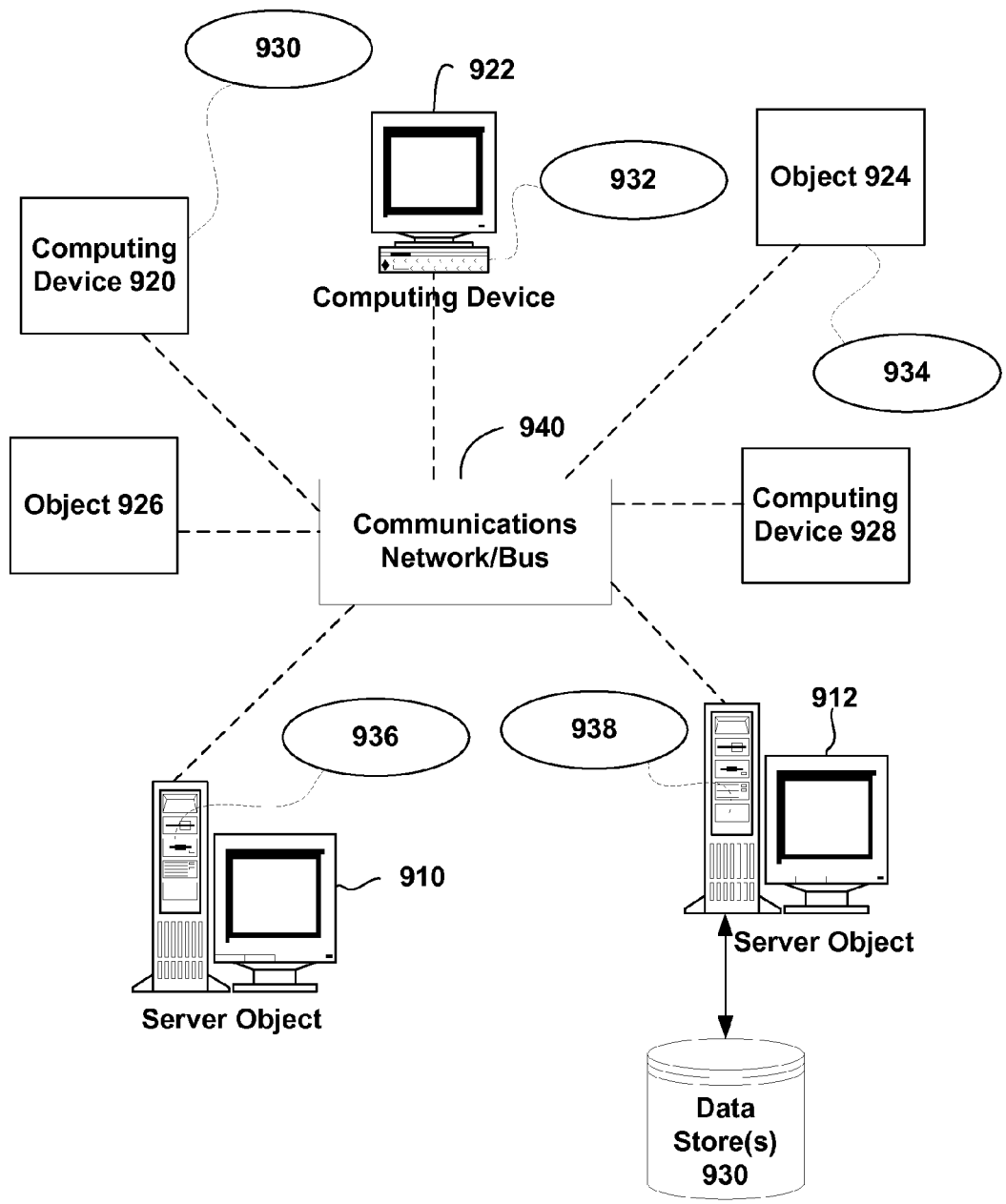
FIG. 9 is a block diagram representing exemplary non-limiting networked environments in which various embodiments described herein can be implemented.

FIG. 9 provides a non-limiting schematic diagram of an exemplary networked or distributed computing environment. The distributed computing environment comprises computing objects or devices 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects or devices 910, 912, etc. and computing objects or devices 920, 922, 924, 926, 928, etc. may comprise different devices, such as PDAs, audio/video devices, mobile phones, MP3 players, laptops, etc.

Each computing object or device 910, 912, etc. and computing objects or devices 920, 922, 924, 926, 928, etc. can communicate with one or more other computing objects or devices 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object or device 910, 912, etc. or 920, 922, 924, 926, 928, etc. can also contain an application, such as applications 930, 932, 934, 936, 938, that might make use of an API, or other object, software, firmware and/or hardware, suitable for communication with or implementation of memory management systems as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects or devices 910, 912, etc. can be thought of as servers where computing objects or devices 910, 912, etc. provide data services, such as receiving data from computing objects or devices 920, 922, 924, 926, 928, etc., storing of data, processing of data, transmitting data to computing objects or devices 920, 922, 924, 926, 928, etc., although any computer can be considered a client, a server, or both, depending on the circumstances. Any of these computing devices may be processing data, or requesting services or tasks that may implicate an infrastructure for information as a service from any platform and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 940 is the Internet, for example, the computing objects or devices 910, 912, etc. can be Web servers with which the computing objects or devices 920, 922, 924, 926, 928, etc. communicate via any of a number of known protocols, such as HTTP. As mentioned, computing objects or devices 910, 912, etc. may also serve as computing objects or devices 920, 922, 924, 926, 928, etc., or vice versa, as may be characteristic of a distributed computing environment.

Exemplary Computing Device

As mentioned, various embodiments described herein apply to any device wherein it may be desirable to implement an infrastructure for concurrently marking and sweeping objects within a conservative garbage collecting algorithm. It is understood, therefore, that handheld, portable and other computing devices and computing objects of all kinds are contemplated for use in connection with the various embodiments described herein, i.e., anywhere that a device may provide some functionality in connection with implementing a conservative garbage collecting algorithm with tagged integers. Accordingly, the below general purpose remote computer described below in FIG. 10 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 10:
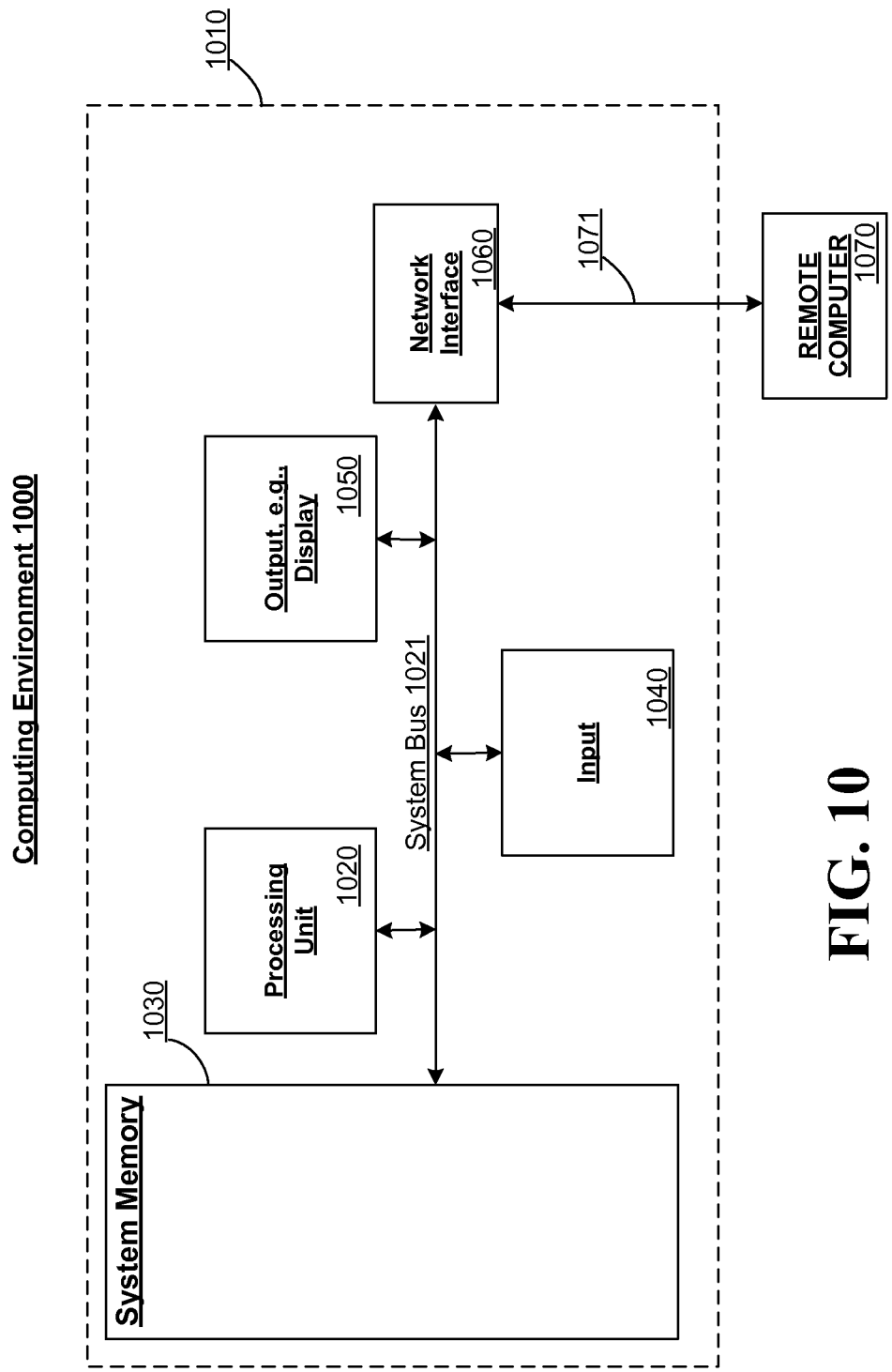
FIG. 10 is a block diagram representing an exemplary non-limiting computing system or operating environment in which one or more aspects of various embodiments described herein can be implemented.

FIG. 10 thus illustrates an example of a suitable computing system environment 1000 in which one or more of the embodiments may be implemented, although as made clear above, the computing system environment 1000 is only one example of a suitable computing environment and is not intended to suggest any limitation as to the scope of use or functionality of any of the embodiments. The computing environment 1000 is not to be interpreted as having any dependency or requirement relating to any one or combination of components illustrated in the exemplary operating environment 1000.

With reference to FIG. 10, an exemplary remote device for implementing one or more embodiments herein can include a general purpose computing device in the form of a handheld computer 1010. Components of handheld computer 1010 may include, but are not limited to, a processing unit 1020, a system memory 1030, and a system bus 1021 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user may enter commands and information into the computer 1010 through input devices 1040 A monitor or other type of display device is also connected to the system bus 1021 via an interface, such as output interface 1050. In addition to a monitor, computers may also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1071, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to manage memory.

There are multiple ways of implementing one or more of the embodiments described herein, e.g., an appropriate API, tool kit, driver code, operating system, control, standalone or downloadable software object, etc. which enables applications and services to use the memory management from any platform. Embodiments may be contemplated from the standpoint of an API (or other software object), as well as from a software or hardware object that facilitates provision of a memory management system in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the present invention should not be limited to any single embodiment, but rather should be construed in breadth and scope in accordance with the appended claims.

What is claimed is:

1. A method, comprising:
generating a heap of objects during an execution of a script;
tracing script objects included in an unexecuted portion of the script to a corresponding set of memory locations on the heap;
marking at least a portion of the heap concurrently with the execution of the script, wherein a marked heap includes reachable objects reachable by the unexecuted portion of the script, and wherein the marked heap further includes unreachable objects unreachable by the unexecuted portion of the script; and
freeing memory allocated to the unreachable objects, wherein the freeing is based on the marking and performed concurrently with the execution of the script.

2. The method according to claim 1, wherein the marking comprises marking the reachable objects.

3. The method according to claim 1, wherein the marking comprises marking the unreachable objects.

4. The method according to claim 1, wherein the freeing comprises respectively preserving the reachable objects in original storage locations of the heap.

5. The method according to claim 4, wherein the preserving comprises maintaining a separation of heap objects according to a fixed set of boundaries within the heap.

6. The method according to claim 1, further comprising executing the script.

7. The method according to claim 6, wherein the executing comprises compiling a javascript.

8. The method according to claim 6, wherein the executing comprises modifying a document object model.

9. A memory management device, comprising:
a memory having computer executable components stored thereon; and a processor communicatively coupled to the memory, the processor configured to execute the computer executable components, the computer executable components comprising:

a heap component configured to generate a heap of objects during an execution of a script;

a tracing component configured to trace script objects included in an unexecuted portion of the script to a corresponding set of memory locations on the heap;

a marking component configured to mark at least a portion of the heap concurrently with the execution of the script, wherein a marked heap includes reachable objects reachable by the unexecuted portion of the script, and wherein the marked heap further includes unreachable objects unreachable by the unexecuted portion of the script; and a recycling component configured to free memory allocated to the unreachable objects according to the marked heap, wherein the recycling component is further configured to free the memory concurrently with the execution of the script.

10. The memory management device of claim 9, wherein the marking component is configured to mark only one of the reachable objects or the unreachable objects.

11. The memory management device of claim 9, wherein the recycling component is configured to recycle a portion of the memory allocated to the unreachable objects prior to a freeing of an entire portion of the memory allocated to the unreachable objects.

12. The memory management device of claim 9, wherein the recycling component is configured to respectively preserve reachable objects in original storage locations of a heap.

13. The memory management device of claim 12, wherein the recycling component is configured to maintain a separation of heap objects according to a fixed set of boundaries within the heap.

14. The memory management device of claim 9, further comprising an execution component configured to execute the script.

15. The memory management device of claim 14, further comprising a compilation component configured to compile a javascript.

16. The memory management device of claim 14, further comprising a component configured to modify a document object model based on the execution of the script.

17. A computer-readable storage memory, comprising computer-readable instructions, the computer-readable instructions including instructions for causing at least one computing device including a processor to perform operations, comprising:

generating an object graph associated with a call stack;

tracing the object graph, wherein script objects included in an unexecuted portion of the call stack are traced to a corresponding set of memory locations on a heap;

marking heap objects concurrently with an execution of the call stack, wherein a marked heap includes reachable objects reachable by the unexecuted portion of the call stack, and wherein the marked heap further includes unreachable objects unreachable by the unexecuted portion of the call stack; and clearing memory allocated to the unreachable objects, wherein the memory is cleared concurrently with the execution of the call stack based on the marked heap.

18. The computer-readable memory according to claim 17, wherein the computer-readable instructions further include instructions for recycling a portion of the memory allocated to the unreachable objects.

19. The computer-readable memory according to claim 18, wherein the recycling is performed prior to a freeing of an entire portion of the memory allocated to the unreachable objects.

20. The computer-readable storage memory according to claim 17, wherein the clearing comprises respectively preserving a storage of the reachable objects in original memory locations on the heap.

* * * * *